(12) United States Patent
Sahara

(10) Patent No.: US 8,300,623 B2
(45) Date of Patent: Oct. 30, 2012

(54) FRAME SYNCHRONIZATION METHOD OF OFDM COMMUNICATION SYSTEM AND RECEIVER THEREFOR

(75) Inventor: Toru Sahara, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 715 days.

(21) Appl. No.: 12/447,210

(22) PCT Filed: Oct. 25, 2007

(86) PCT No.: PCT/JP2007/070857
§ 371 (c)(1),
(2), (4) Date: Apr. 24, 2009

(87) PCT Pub. No.: WO2008/050849
PCT Pub. Date: May 2, 2008

(65) Prior Publication Data
US 2009/0316634 A1      Dec. 24, 2009

(30) Foreign Application Priority Data
Oct. 26, 2006   (JP) .................................. 2006-291119

(51) Int. Cl.
*H04J 3/06*   (2006.01)
(52) U.S. Cl. ........................................ 370/350; 370/503
(58) Field of Classification Search .................... 370/350
See application file for complete search history.

(56) References Cited

U.S. PATENT DOCUMENTS

| | | | |
|---|---|---|---|
| 6,711,123 B1 * | 3/2004 | Taira | 370/208 |
| 7,430,193 B2 | 9/2008 | Kim et al. | 370/338 |
| 2006/0114812 A1 | 6/2006 | Kim et al. | 370/206 |

FOREIGN PATENT DOCUMENTS

| | | |
|---|---|---|
| JP | 05-300078 | 11/1993 |
| JP | 07-273689 | 10/1995 |
| JP | 2003-324409 | 11/2003 |
| JP | 2004-207983 | 7/2004 |
| JP | 2004207983 A * | 7/2004 |

OTHER PUBLICATIONS

JP 2004207983a, Translated document using JPO, p. 1-20, Nagate Atsushi;Fujii Teruya, published Jul. 22, 2004, Japan Telecom Co. Ltd.*

* cited by examiner

*Primary Examiner* — Anh-Vu Ly
*Assistant Examiner* — Maharishi Khirodhar
(74) *Attorney, Agent, or Firm* — DLA Piper LLP (US)

(57) ABSTRACT

Provided are a new frame synchronization method, which is capable of shortening the time necessary for frame synchronization between a receiver and a base station of PHS based on an OFDM communication system, and the receiver therefor.

A frame synchronization method of OFDM communication system includes: a symbol synchronization step of obtaining a synchronization timing for each OFDM symbol by executing calculation of correlation in the symbols on the basis of an autocorrelation factor included in each OFDM symbol transmitted from wireless base stations; a unique symbol correlation search stop of obtaining timing of a notification channel by executing calculation of correlation for a unique symbol included in the notification channel; and a notification channel decoding step of executing decoding of the notification channel or a channel synchronized with the notification channel on the basis of timing when a degree of correlation obtained by the unique symbol correlation search is highest.

4 Claims, 12 Drawing Sheets

FRAME SYNCHRONIZATION METHOD OF OFDM COMMUNICATION SYSTEM AND RECEIVER THEREFOR

TECHNICAL FIELD

The present invention relates to a new frame synchronization method, which is capable of shortening the time necessary for frame synchronization between a receiver and a base station of PHS based on an OFDM communication system, and the receiver therefor.

BACKGROUND ART

The known examples of frame synchronization include the following techniques (refer to Patent Document 1).

Patent Document 1 discloses the following frame synchronous system.

In TDMA (time-division multiplex access) system, a plurality of wireless stations time-divisionally uses one radio frequency. In the TDMA system, a sound signal is converted into a digital signal, and subsequently a speed conversion is additionally performed, thereby transmitting the signal to a time slot which is assigned to the corresponding station. Reception is performed in a way that a reverse speed conversion is performed on the signal of the time slot assigned to the corresponding station, the digital signal is reconverted into the analog sound signal, and the reconverted signal is output.

On the other hand, when a mobile station moves and enters into a service area (zone) of another wireless base station, sometimes TDMA frame synchronization is not established. In this case, in response to a received signal from the wireless base station of the destination, frame synchronization should be reestablished in accordance with synchronization establishment procedure. However, communication is cut off until synchronization is reestablished.

In contrast, when TDMA frame synchronization is established, communication can be continuously performed without execution of the synchronization establishment procedure. Accordingly, in order to prevent communication black out, it is necessary to always maintain establishment of TDMA frame synchronization between wireless base stations adjacent to each other without a large equipment.

Therefore, even when the mobile station moves to the adjacent zone, it is necessary to establish synchronization between TDMA frames transmitted from the wireless base stations in order to continuously perform transmission and reception between the mobile station and the wireless base station of the adjacent zone.

Accordingly, a reference wireless base station BSR which is a time reference is provided to transmit a reference TDMA frame. With such a configuration, each wireless base station generates a TDMA frame on the basis of the time reference which is generated by slave synchronization to the reference TDMA frame, and transmits and receives signals to and from the mobile station in the corresponding zone on the basis of the frame, thereby performing continuous communication without executing the synchronization establishment procedure even when the mobile station moves to the adjacent zone.

Patent Document 1 also discloses the following frame synchronous system.

In the system, a service area is divided into a plurality of zones, and each zone has a wireless base station BS. Each wireless base station has a standard electric-wave receiver capable of receiving a standard wave in mobile communication network for mutually transmitting and receiving signals on the basis of a TDMA system and a mobile station MS in the corresponding zone where a wireless link is established. Each wireless base station is configured to generate a TDMA frame by using the received signal, which is transmitted when a time signal preset by the standard wave receiver is received, as a time reference and to establish TDMA frame synchronization between the zones.

In the frame synchronization, which is the related art of the invention, between the receiver and the base station of PHS based on the TDD/TDMA system, the base station performs intermittent transmission on the basis of the TDD/TDMA system, and the receiver decodes the received timing while delaying time little by little, thereby searching an intermittently transmitted CCH of the base station. In this method the frame synchronization is performed.

Patent Document 1: Japanese Unexamined Patent Application Publication No. H05-300078

DISCLOSURE OF THE INVENTION

Problem that the Invention is to Solve

However, when an OFDM communication system such as a TDD/OFDMA system to which the application is applicable is used, a GI (guard interval) length is removed from the received and processed signal, and thus it is difficult to time-continuously detect timing. Accordingly, when a frame synchronization detection system such as the known PHS is used, a shiftable range of the timing decreases. As a result, a problem arises in that the frame synchronization takes excessively long time.

A task (object) of the invention is to provide a new frame synchronization method, which is capable of shortening the time necessary for frame synchronization between a receiver and a base station of PHS based on an OFDM communication system, and the receiver therefor.

Means for Solving the Problem

In order to solve the task mentioned above, a frame synchronization method of OFDM communication system according to the invention includes: a symbol synchronization step of obtaining a synchronization timing for each OFDM symbol by executing calculation of correlation in the symbols on the basis of an autocorrelation factor included in each OFDM symbol transmitted from wireless base stations; a unique symbol correlation search step of obtaining timing of a notification channel by executing calculation of correlation for a unique symbol included in the notification channel; and a notification channel decoding step of executing decoding of the notification channel or a channel synchronized with the notification channel on the basis of timing when a degree of correlation obtained by the unique symbol correlation search is highest.

Furthermore, the method further includes a step of acquiring base-station identification information and a time slot number from a data section of the notification channel in a case where an error does not exist at a result of error detection executed after the notification channel decoding step.

Further, the method further includes a notification channel decoding step of executing decoding of the notification channel on the basis of timing when a degree of correlation obtained by the unique symbol correlation search is second highest in a case where an error exists as a result of error detection executed after the notification channel decoding step.

In addition, the method further includes a step of executing frequency correction and symbol synchronization based on timing when the decoding of the notification channel is executed.

Furthermore, the method includes a step of reading out a received signal, which is stored in a frame signal storage section, by one frame; a step of calculating a value of correlation between the received signal which is read out and a unique symbol which is previously set; and a notification channel decoding step of trying decoding of the notification channel at timing when a rank is high in a case where ranks are given in order from symbol timing when the calculated correlation value is highest.

Further, the method further includes a notification channel decoding step of executing decoding of the notification channel on the basis of timing when a degree of correlation obtained by the unique symbol correlation search is second highest in a case where an error exists as a result of error detection executed after the notification channel decoding step.

An OFDM receiver according to the invention includes: symbol synchronization unit for obtaining a synchronization timing for each OFDM symbol by executing calculation of correlation in the symbols on the basis of an autocorrelation factor included in each OFDM symbol transmitted from wireless base stations; unique symbol correlation search unit for obtaining timing of a notification channel by executing calculation of correlation for a unique symbol included in the notification channel; notification channel decoding unit for executing decoding of the notification channel at timing when a degree of correlation obtained by the unique symbol correlation search is highest; and storage unit for storing base-station identification information and a time slot number by acquiring those from a data section of the notification channel as a result of the notification channel decoding.

Further, in the receiver, decoding of the notification channel is tried on the basis of timing when correlation is second highest in a case where an error exists as a result that decoding of the notification channel is tried at the timing when correlation is highest.

Advantage of the Invention

According to the frame synchronization method and the receiver of the TDD/OFDMA communication system using the OFDM communication system described herein, it is possible to realize a new frame synchronization method, which is capable of shortening the time necessary for frame synchronization between a receiver and a base station of the PHS based on the TDD/OFDMA communication system, and the receiver therefor.

DESCRIPTION OF REFERENCE NUMERALS AND SIGNS

1: RECEIVING PART
2: SIGNAL PROCESSING PART
2-1: SYMBOL SYNCHRONIZING SECTION
2-2: MEMORY
2-3: FFT PROCESSING SECTION
2-4: FREQUENCY ESTIMATION SECTION/CHANNEL ESTIMATION SECTION
2 5: UNIQUE SYMBOL CORRELATION CALCULATION SECTION
2-6: MEMORY
2-7: NOTIFICATION CHANNEL DECODING SECTION
2-8: FRAME SYNCHRONIZING SECTION (SYNC DETERMINATION SECTION)

BEST MODE FOR CARRYING OUT THE INVENTION

A hardware configuration of receiver will be described, which is able to establish frame synchronization with a transmitter which intermittently transmits control information at a period, which is previously notified, by use of a TDD/OFDMA system according to the present invention.

Figure 1:
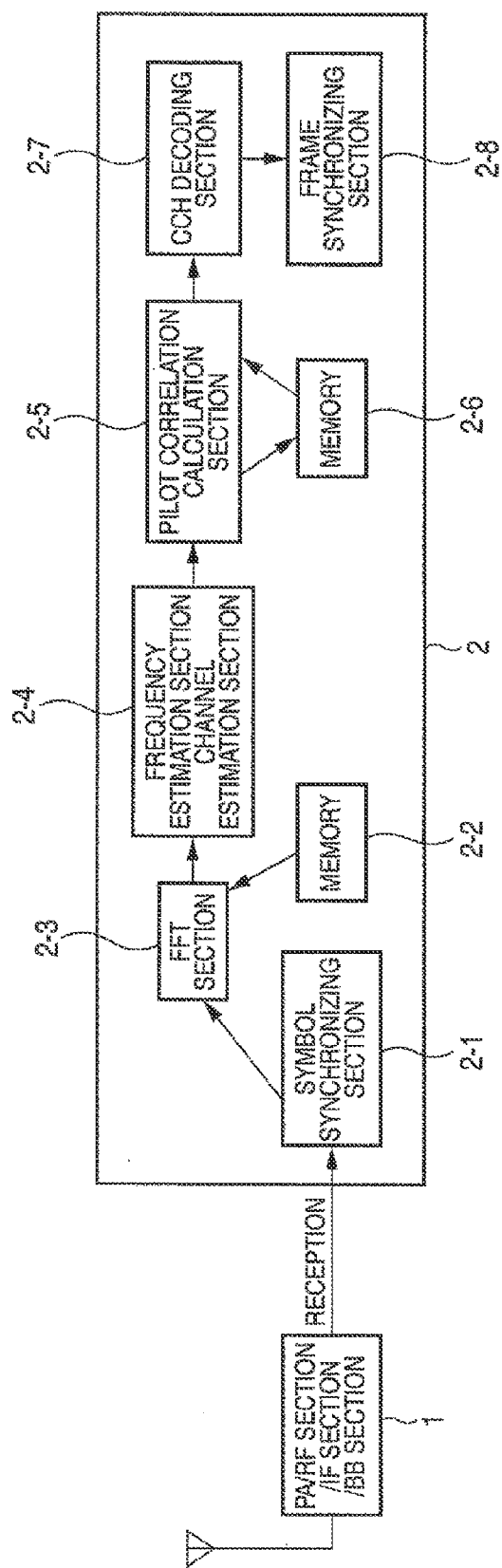
FIG. 1 is a diagram showing a hardware configuration of a receiver of a TDD/OFDMA system according to the present invention.

FIG. 1 is functional block diagram of the receiver according to the invention. The receiver includes a receiving part 1 (PA/RF section/TF section/RR section) and a signal processing part 2 for processing a received signal.

The signal processing part 2 showing characteristics of the invention includes a symbol synchronizing section 2-1, a memory 2-2, an FFT section 2-3, a frequency estimation section (channel estimation section) 2-4, a unique symbol correlation calculation section 2-5, a memory 2-6, a notification channel decoding section, and a frame synchronizing section (synchronization determination section).

The symbol synchronizing section 2-1 executes symbol synchronization at timing when correlation is highest in step S2 (step 332) of the above-mentioned flowchart.

In addition, the sum of phase differences between symbols can be obtained in the symbol synchronizing section 2-1 in order to correct frequency deviation of the receiver. Therefore, by returning the symbol by the phase difference, it is possible to perform frequency correction.

The memory 2-2 stores, on the basis of timing which can be obtained by the symbol synchronization, the timing and a correlation value obtained by trying symbol synchronization.

The FFT section 2-3 executes extraction of a symbol of a received CCH by performing FFT in the range of time having a predetermined relationship with the timing stored in the memory 2-2.

The frequency estimation section (channel estimation section) 2-4 executes frequency correction and channel correction on the basis of a symbol of a received notification channel (CCH) extracted by performing FFT at timing when correlation is highest in the FFT section 2-3.

The unique symbol (pilot symbol) correlation calculation portion 2-5 stores timing of the symbol unit and a value of correlation with the unique symbol in the memory 2-6.

The memory 2-6 stores the timing of the symbol unit and the value of correlation with the unique symbol obtained in step S7 of the flowchart.

The CCH decoding section 2-7 executes decoding of a notification channel at timing when correlation is highest in step S8.

The frame synchronizing section (synchronization determination section) 2-8 performs error checking. If an error does not exist, the section frequently checks whether the timing error does not exist, and acquires a time slot number and a relative frame number (information on which timing in an intermittent transmission period a signal is obtained at), thereby correcting the timing.

Next, an outline of the frame synchronization in a TDD/OFDMA system according to the invention will be described, in which the receiver establishes frame synchronization with the transmitter which intermittently transmits control information at a period, which is previously set.

A frame configuration, in which the CCH of the system intermittently transmits notification information (unique symbol) by use of one sub-channel of a prescribed CH band, will be described with reference to FIG. 2.

As shown in FIG. 2(a), the frame of TDD/OFDMA communication system includes time slots formed by dividing each 2.5 [ms] of a downlink and an uplink into four, and the sum thereof is 5 [ms].

Each time slot includes a plurality of OFDM sub-carriers*OFDM symbols as shown in FIG. 2(b). Accordingly, each OFDM symbol includes an FFT range (a waveform corresponding to a width of time in which an FFT processing is performed) and an autocorrelation factor (for example, a guard interval (GI)) disposed such that a continuous waveform is formed by copying the waveform, as shown in FIG. 2(c).

The guard interval (GI) eliminates an effect caused by timings of a plurality of propagation channels.

In addition, in the TDD/OFDMA system according to the invention, the notification channel (CCH) including a unique symbol is intermittently transmitted from the base station (CS) for every n frame (for example, a period of 5*n [ms]) of the downlink.

A basic flow of the frame synchronization of the TDD/OFDMA communication system according to the invention is as follows.

At the time of activating the receiver (PS), the following open-search is executed in order to achieve synchronization between the base station (CS) and the receiver (PS).

(a) Synchronization timing for each OFDM symbol are obtained by executing calculation of correlation in the symbols on the basis of the autocorrelation factor (for example, guard interval) included in each OFDM symbol (symbol synchronization step).

(b) Timing of the notification channel is obtained by executing calculation of correlation for the unique symbol included in the notification channel (unique symbol correlation search step).

(c) Decoding of the notification channel is executed at timing when a degree of correlation is high in the unique symbol correlation search (notification channel decoding step).

(d) If error detection, for example, CRC is OK as a result of the notification channel decoding, the frame synchronization is terminated.

A symbol synchronization procedure according to the invention will be described with reference to FIGS. 3 and 4.

Figure 3:
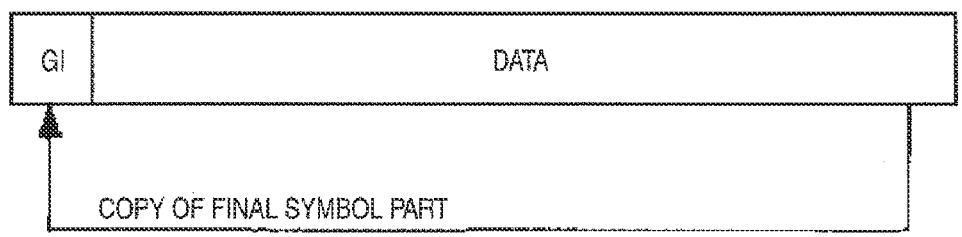
FIG. 3 is a diagram showing a symbol structure of an OFDMA signal used in the TDD/OFDMA system according to the invention.

FIG. 3 is a diagram showing a symbol structure of an OFDMA signal used in the TDD/OFDMA system according to the invention.

Figure 2:
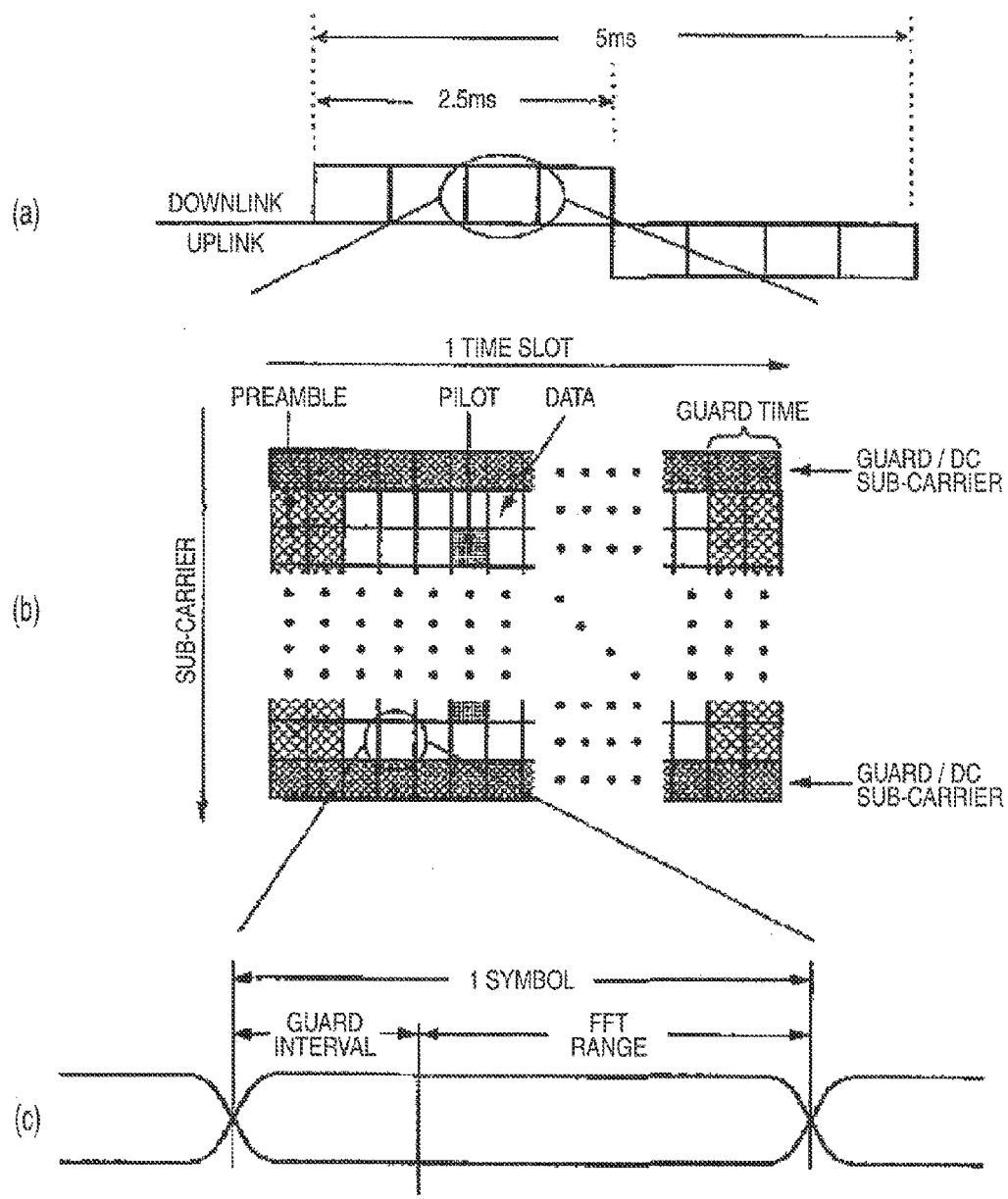
FIG. 2 is a diagram showing a frame configuration for intermittently transmitting notification information (unique symbol) according to the invention.

In FIG. 3, the symbol includes an FFT range (a waveform corresponding to a width of time in which an FFT processing is performed) as data and an autocorrelation factor (for example, a guard interval (GI)) disposed such that a continuous waveform is formed by copying the waveform, as shown in FIG. 2 (c).

Figure 4:
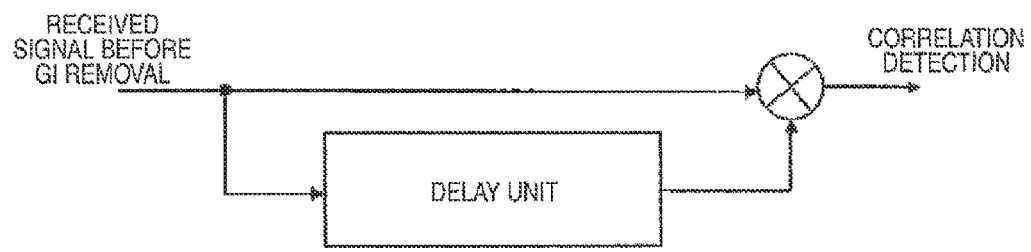
FIG. 4 is a block diagram showing a process of the symbol synchronization according to the invention.

FIG. 4 is a diagram showing a configuration for performing the symbol synchronization according to the invention.

In FIG. 4, the received signal before removal of the guard interval (GI) as an autocorrelation factor is delayed by a data length (data part in FIG. 3) with a delay unit, and calculation of correlation between the delayed signal and data which is not delayed is executed, thereby detecting timing overlapped with the guard interval (GI) and establishing symbol synchronization (accuracy depends on a sampling rate).

Sliding correlation of the guard interval (GI) length searches 5*n intervals by performing detection with an average of several symbols (for example, 10 symbols).

Figure 5:
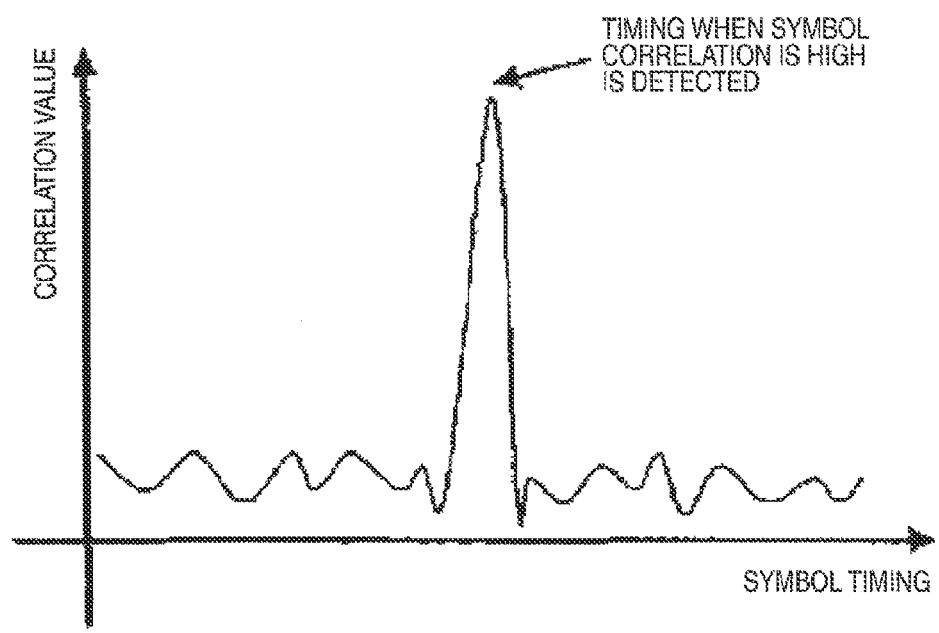
FIG. 5 is a diagram showing a state of a correlation value when timing is delayed at the time of execution of the symbol synchronization according to the invention.
Figure 6:
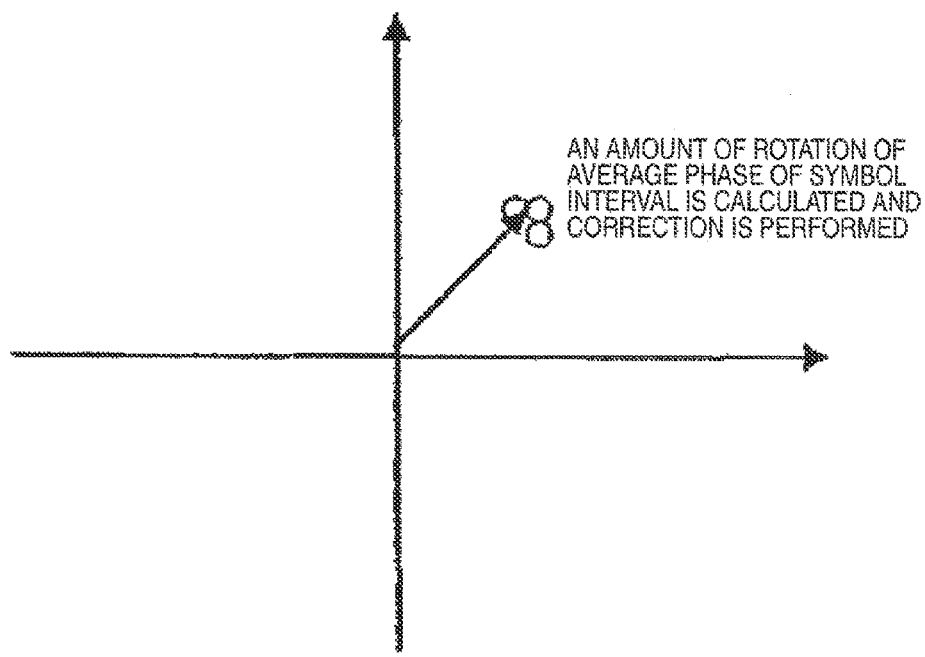
FIG. 6 is a diagram showing a phase vector when the symbol correlation, which is shown in FIG. 3, according to the invention is applied.
Figure 7:
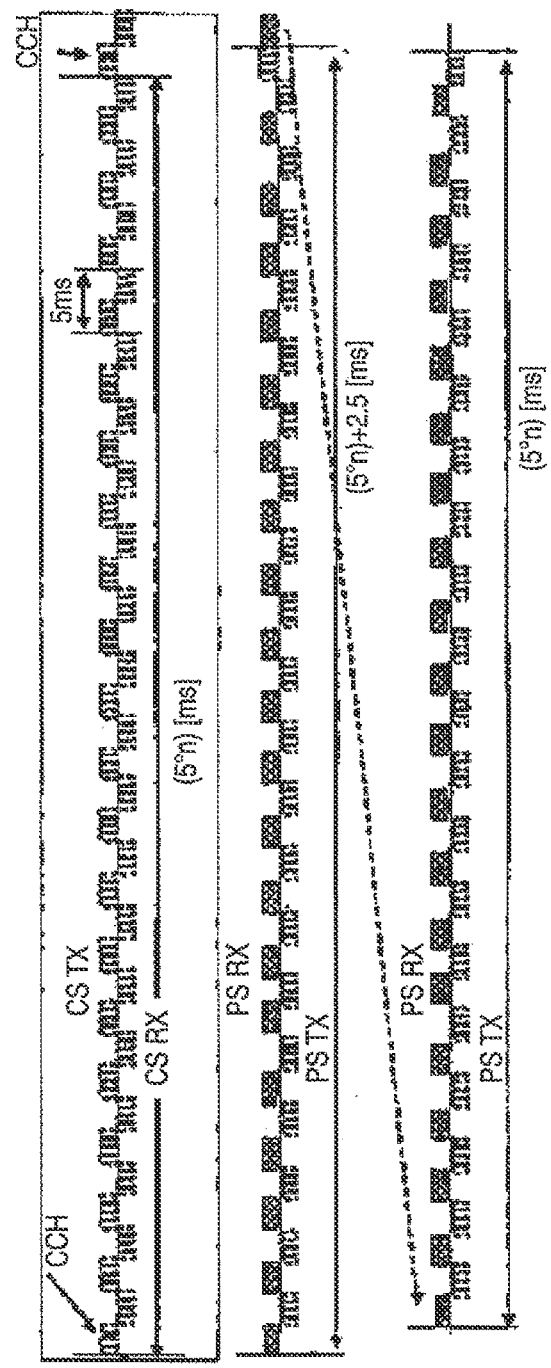
FIG. 7 is a diagram showing a received signal when a pilot correlation search and a notification channel decoding are executed after the symbol synchronization is executed at timing of the highest symbol correlation.
Figure 8:
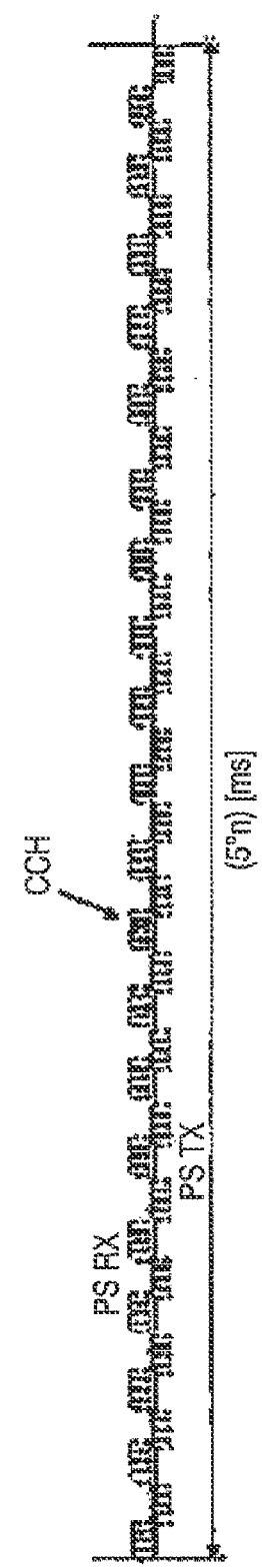
FIG. 8 is a diagram showing a received signal when a unique symbol correlation search and a notification channel decoding are executed after the symbol synchronization is executed at timing of the highest symbol correlation in an interval deviated at 2.5 [ms] in the case of detection failure of base-station identification information (CS ID) and a time slot number.

Timing when a correlation value is highest is detected and is set as symbol timing as shown in FIG. 5, and an amount of rotation of average phase of the symbol interval is calculated as shown in FIG. 6, thereby performing frequency correction of the received symbol.

Next, a procedure regarding activation of the symbol synchronization and timing search of the frame synchronization will be described with reference to the flowchart of FIGS. 9 to 11 as an example of the frame synchronization of TDD/OFDMA communication system according to the invention.

The transmitter starts intermittent transmission of the notification channel (CCH) at the time slot constituted by the OFDM symbol with a period of (5 [ms]*n) frame (step S1).

The receiver executes activation of the symbol synchronization using the autocorrelation factor (for example, guard interval (GI)).

In this example, activation of the symbol synchronization in the receiver in composed of subroutines.

Hereinafter, subroutines of activation of the symbol synchronization in the receiver will be described with reference to FIG. 10.

When the symbol synchronization using the autocorrelation factor (GI) is activated, the delay unit (refer to FIG. 4) included in the symbol synchronizing section 2-1 in FIG. 1 is activated such that a signal can be obtained by delaying the received signal as long as the time corresponding to the FFT range (step S2-1).

The correlation calculation portion, which is included in the symbol synchronizing section 2-2 of FIG. 1, for the symbol synchronization is activated so as to calculate a degree of correlation between the signal which is delayed as long as the time corresponding to the FFT range and the signal which is not delayed (step S2-2).

By activating the symbol timing acquisition portion included in the symbol synchronization section 2-2 of FIG. 1, symbol timing, which is based on the timing (refer to FIG. 5) capable of obtaining the highest correlation in the range corresponding to one symbol, is obtained and is stored in the memory 2-2 of FIG. 1 (step S2-3).

n is set, which is a frame number in a period of notification information (unique symbol) transmission performed by the base station (step S3).

Frequency correction (refer to FIG. 6) is started by checking a frequency offset of the receiver from phase differences of the symbols, on the basis of the symbol timing which can be obtained by the symbol synchronizing section (step S4).

An FFT operation is started by the FFT section 2-3 of FIG. 1 for each symbol, on the basis of the symbol timing which can be obtained by the symbol synchronizing section 2-2 (step S5).

The frame signal storage section (memory 2-6 of FIG. 1) is activated in order to sequentially store one or more frames of the signal which in obtained by the FFT (step S6).

Figure 11:
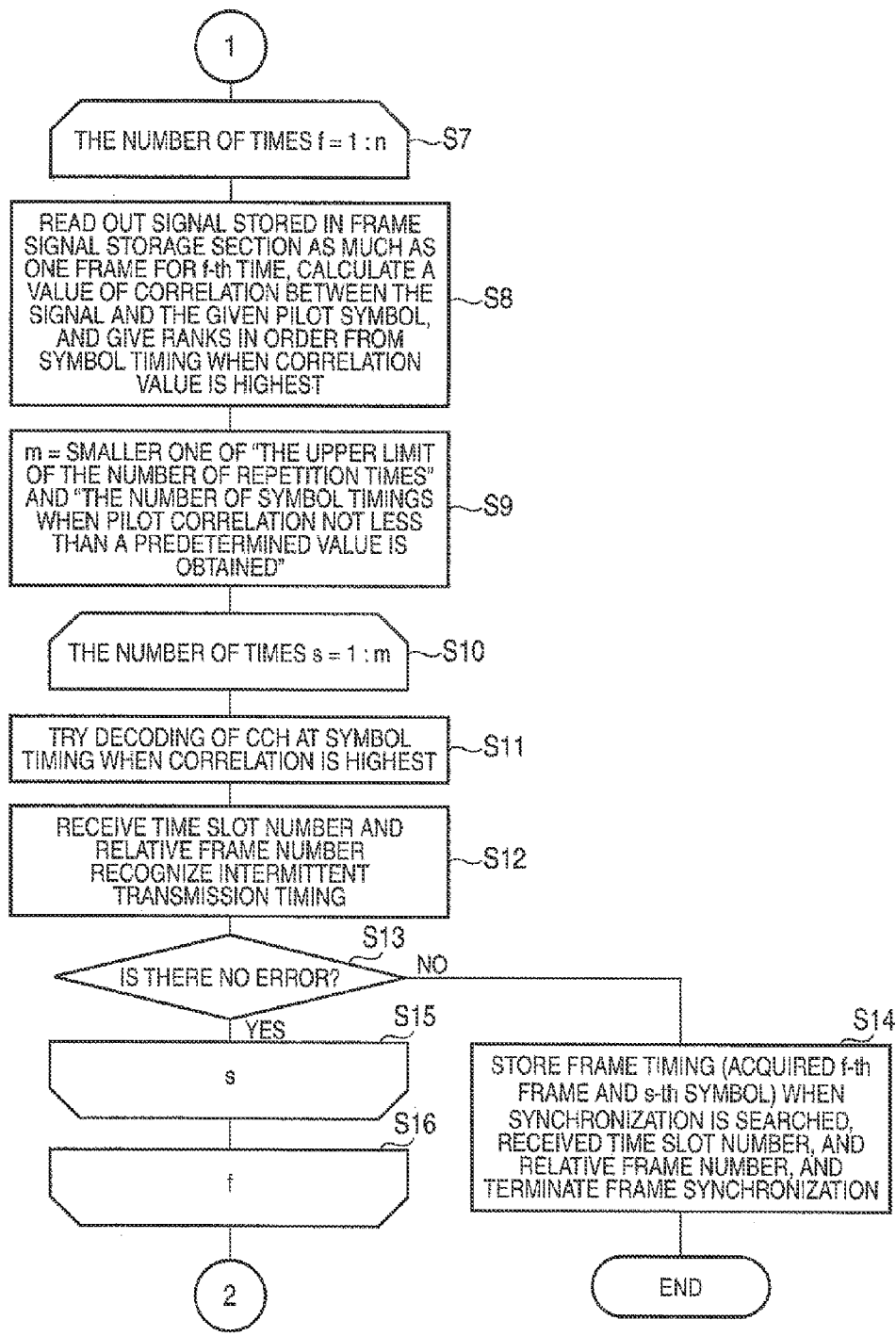
FIG. 11 is a flowchart (2) showing a procedure of the frame synchronization between a transmitter and a receiver in the TDD/OFDMA system according to the invention.

Steps S7 and S16 and steps S10 and S15 correspond to each other in the flowchart of FIG. 11.

An initial value of the number of times f is set to 1 and process until step S16 is repeated. The number of times f increases by 1 whenever the process is repeated, and the process is repeated until the number reaches a final value n (step S7).

The signal stored in the frame signal storage section is read out as much as one frame for the f-th time, a value of correlation between the signal and the given unique symbol (pilot symbol) is calculated by the unique symbol (pilot) correlation calculation section 2-5 of FIG. 1, and ranks are given in order from the symbol timing when the correlation value is highest (step S8).

The number of repetition times m is set as a smaller one of the upper limit of the number of repetition times and the number of symbol timings when the unique symbol correlation (pilot correlation) not less than a predetermined value is obtained (step S9).

An initial value of the number of times s is set as 1, and the process until step S15 is repeated. The number of times s increases by 1 whenever the process is repeated, and the process is repeated until the number reaches a final value m (step S10).

Decoding of the notification channel (CCH) is tried at the symbol timing when correlation is highest (step S11).

By receiving a time slot number and a relative frame number at that time, intermittent transmission timing is recognized (step S12).

It is determined whether or not an error exists in the decoding in step S11 (step S13).

If it is determined that an error does not exist in step S13, the frame timing (acquired f-th frame and S-th symbol) when synchronization is searched, the received time slot number, and the relative frame number are stored, and the frame synchronization is terminated (step S14).

The process of steps S10 to S15 is repeated until the number of times s reaches the final value m (step S15).

The process of steps S7 to S16 is repeated until the number of times f reaches the final value n (step S16).

As described above, in the procedure regarding activation of the symbol synchronization and timing search of the frame synchronization in the flowchart of the example, positional correlation of (symbol s)*(frame f) is based on a double loop. Furthermore, the loop is performed maximally m*n times, but the process may escape from the loop in the course thereof if "NO" in step S13. In contrast, if synchronization is failed even when the process is repeated m*n times, the process returns to step S3.

Figure 9:
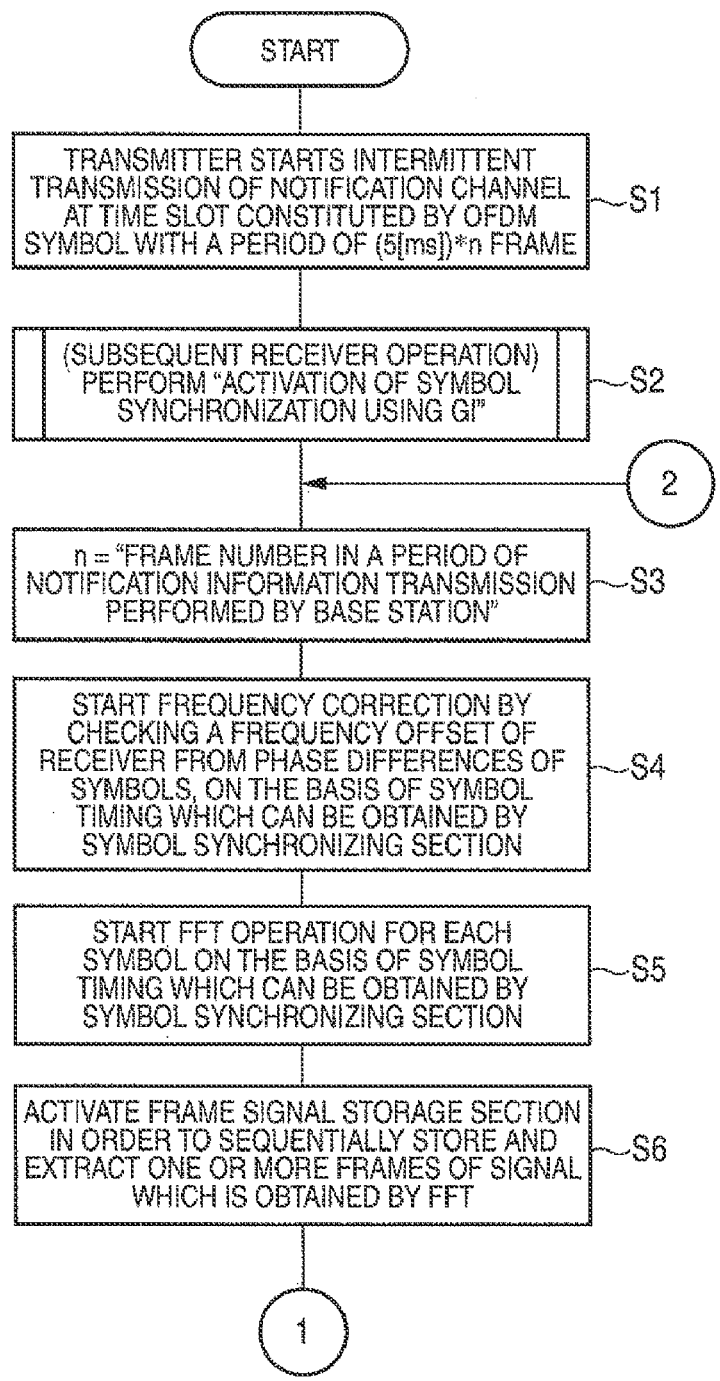
FIG. 9 is a flowchart (1) showing a procedure of the frame synchronization between a transmitter and a receiver in the TDD/OFDMA system according to the invention.
Figure 10:
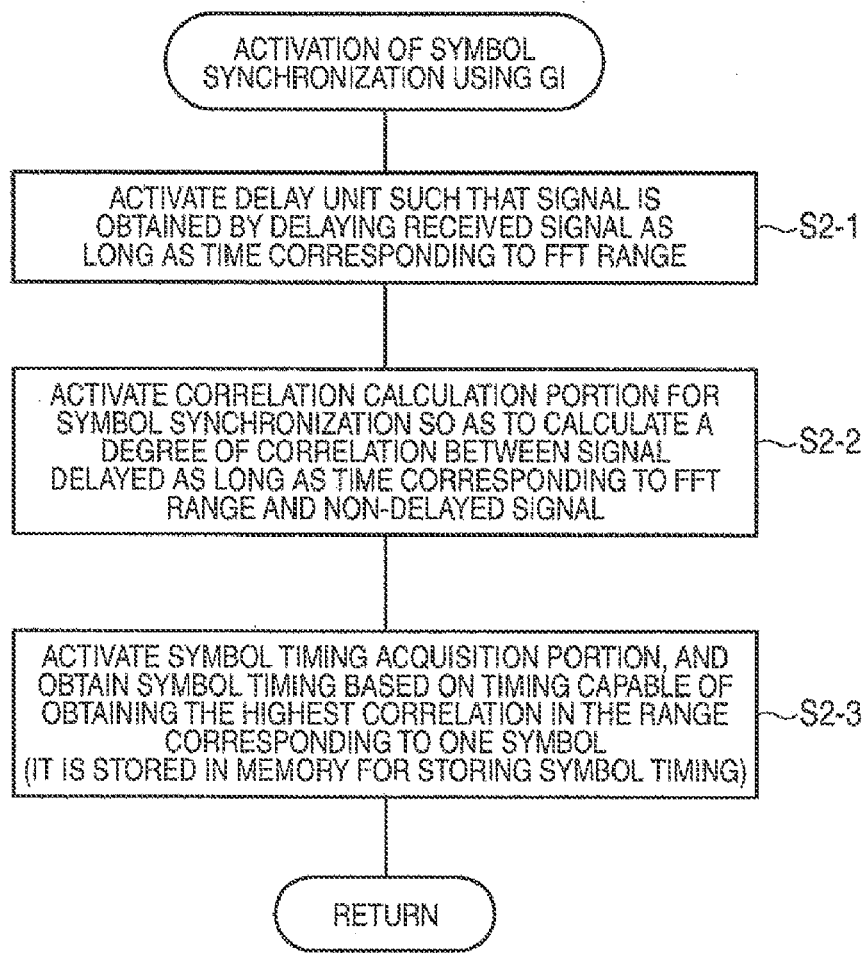
FIG. 10 is a flowchart showing a subroutine of activation of the symbol synchronization.

Furthermore, the above mentioned operation in the flowchart of FIGS. 9 to 11 is an operation of storage by one frame in step S8. However, the operation may be adapted to acquire the time (for example, 2.5 [ms] or the like) estimated to correspond to the downlink of the frame in order to reduce load of the process, in some cases where some possibility of establishment of frame synchronization exists, for example, a case where synchronization has been established once and the like.

Figure 12:
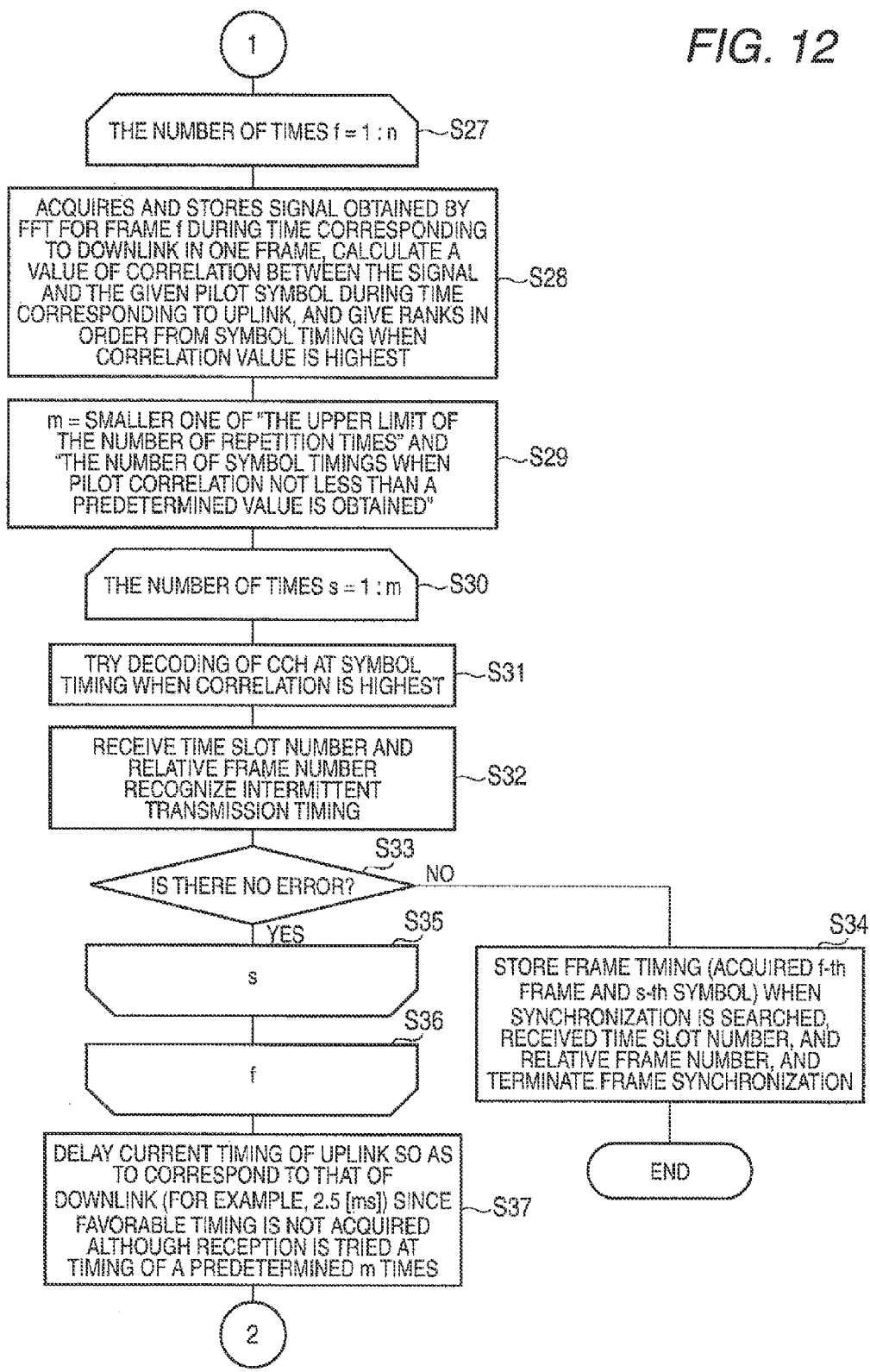
FIG. 12 is a flowchart showing a case of acquisition for a time (for example, 2.5 [ms] or the like) estimated to correspond to frame downlink.

In this case, the procedure uses the flowchart of FIG. 12 instead of the flowchart of FIG. 11.

Steps S27 and S36 and steps S30 and S35 correspond to each other in the flowchart of FIG. 12.

An initial value of the number of times f is set to 1 and the process until step S36 is repeated. The number of times f increases by 1 whenever the process is repeated, and the process is repeated until the number reaches a final value n (step S27).

For the frame f, the signal obtained by the FFT is acquired and stored during the time corresponding to the downlink in one frame, a value of correlation between the signal and the given pilot (unique) symbol is calculated by the pilot (unique) correlation calculation portion 2-5 of FIG. 1 during the time corresponding to the uplink, and ranks are given in order from the symbol timing when the correlation value is highest (step S28).

The number of repetition times m is set as a smaller one between the upper limit of the number of repetition times and the number of symbol timings when the unique symbol correlation (pilot correlation) is not less then a predetermined value (step S29).

An initial value of the number of times s is set as 1, and the process until step S35 is repeated. The number of times s increases by 1 whenever the process is repeated, and the process is repeated until the number reaches a final value m (step S30).

Decoding of the notification channel (CCH) is tried at the symbol timing when correlation is highest (step S31).

By receiving a time slot number and a relative frame number at that time, intermittent transmission timing is recognized (step S32).

It is determined whether or not an error exists in the decoding in step S31 (step S33).

It is determined that an error does not exist in step 33, the frame timing (acquired f-th frame and S-th symbol) when synchronization is searched, the received time slot number, and the relative frame number are stored, and the frame synchronization is terminated (step S34).

The process of steps S30 to S35 is repeated until the number of times s reaches the final value m (step S35).

The process of steps S27 to S36 is repeated until the number of times f reaches the final value n (step S36).

Although reception is tried at timing of a predetermined m times, favorable timing can not be acquired. Hence, the current timing of uplink is delayed to correspond to that of downlink (for example, 2.5 [ms]), and the process returns to step S3 (step S37).

In this case, similarly to FIG. 11, positional correlation of (symbol s)*(frame f) is based on a double loop. Furthermore, the loop is performed maximally m*n times, but the process may escape from the loop in the course thereof if "NO" in step S33. In contrast, if synchronization is failed even when the process is repeated n*m times, the process returns to step S3.

This application is based on Japanese Patent Application No. 2006-291119 filed on Oct. 26, 2006, which is incorporated herein by reference.

The invention claimed is:

1. A frame synchronization method of an OFDM receiver comprising:
    a symbol synchronization step of obtaining a synchronization timing for each OFDM symbol by executing calculation of correlation in the symbols on the basis of an autocorrelation factor included in each OFDM symbol transmitted from wireless base stations;
    a unique symbol correlation search step of obtaining timing of a notification channel by executing calculation of correlation for a unique symbol included in the notification channel;
    a notification channel decoding step of executing decoding of the notification channel or a channel synchronized with the notification channel on the basis of timing when a degree of correlation obtained by the unique symbol correlation search is highest; and
    a notification channel decoding step of executing decoding of the notification channel on the basis of timing when a degree of correlation obtained by the unique symbol correlation search is second highest in a case where an error exists as a result of error detection executed after the notification channel decoding step.

2. The frame synchronization method of the OFDM receiver according to claim 1, further comprising
    a step of executing frequency correction and symbol synchronization based on timing when the decoding of the notification channel is executed.

3. A frame synchronization method of an OFDM receiver comprising:
    a step of reading out a received signal, which is stored in a frame signal storage section, by one frame;
    a step of calculating a value of correlation between the received signal which is read out and a unique symbol which is previously set;
    a notification channel decoding step of trying decoding of the notification channel at timing when a rank is high in a case where ranks are given in order from symbol timing when the calculated correlation value is highest; and
    a notification channel decoding step of executing decoding of the notification channel on the basis of timing when a degree of correlation obtained by the unique symbol correlation search is second highest in a case where an error exists as a result of error detection executed after the notification channel decoding step.

4. An OFDM receiver comprising:
    a symbol synchronization unit for obtaining a synchronization timing for each OFDM symbol by executing calculation of correlation in the symbols on the basis of an autocorrelation factor included in each OFDM symbol transmitted from wireless base stations;
    a unique symbol correlation search unit for obtaining timing of a notification channel by executing calculation of correlation for a unique symbol included in the notification channel;
    a notification channel decoding unit for executing decoding of the notification channel at timing when a degree of correlation obtained by the unique symbol correlation search is highest; and
    a storage unit for storing base-station identification information and a time slot number by acquiring those from a data section of the notification channel as a result of the notification channel decoding,
    wherein decoding of the notification channel is tried on the basis of timing when correlation is second highest in a case where an error exists as a result that decoding of the notification channel is tried at the timing when correlation is highest.

* * * * *